Patented Feb. 4, 1930

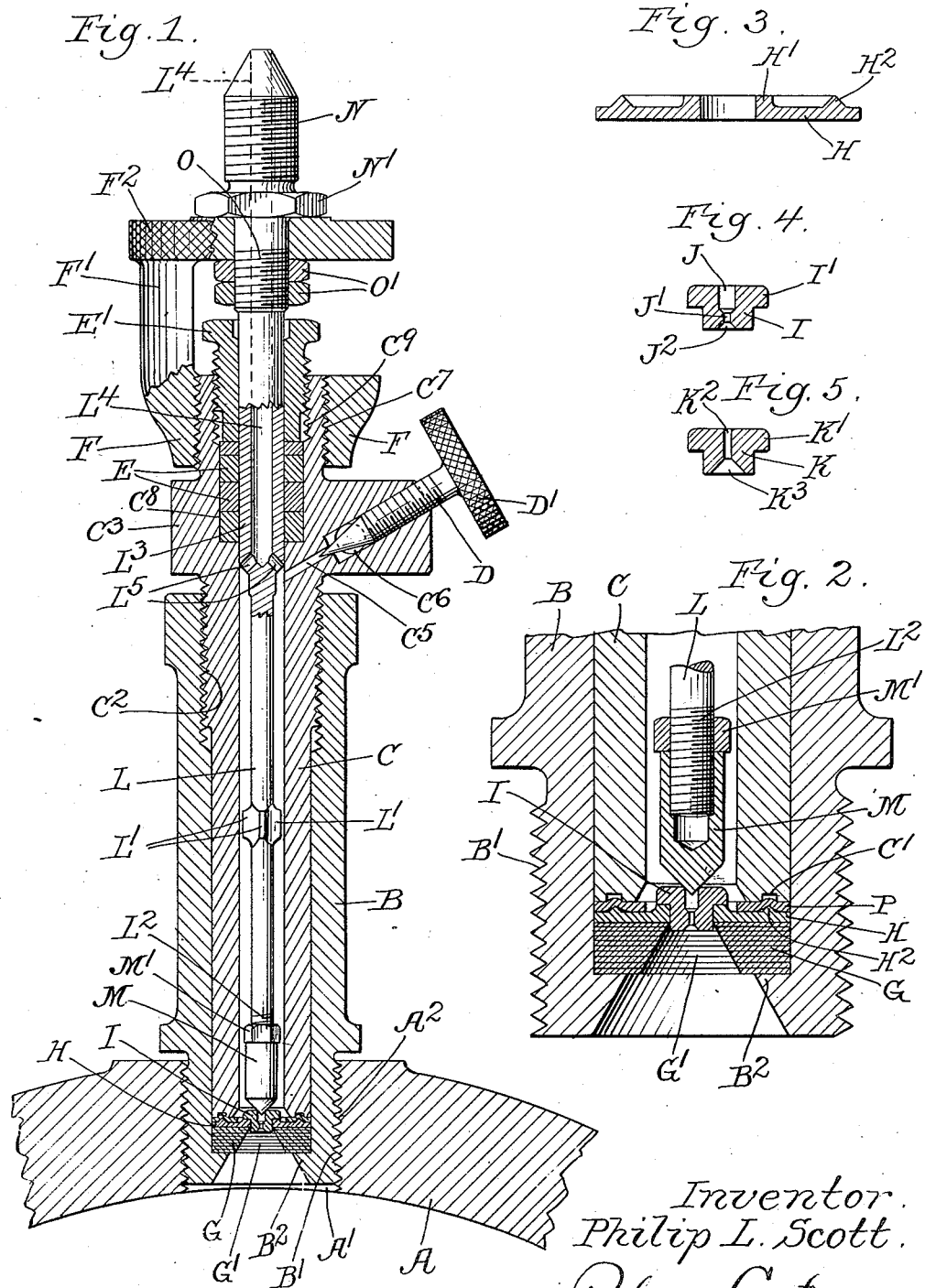

1,745,586

UNITED STATES PATENT OFFICE

PHILIP LANE SCOTT, OF CHICAGO, ILLINOIS, ASSIGNOR TO SUPER DIESEL TRACTOR CORPORATION, OF LA PORTE, INDIANA, A CORPORATION OF NEW YORK

NEEDLE VALVE

Application filed March 10, 1924. Serial No. 698,028.

This invention relates to a valve intended primarily for use in injecting liquid fuel into an internal combustion engine. It may be used, however, for many other types of spraying injection and atomization.

The invention is illustrated more or less diagrammatically in the accompanying drawings, wherein:

Figure 1 is a longitudinal cross section of the valve and a portion of the engine cylinder; showing also some parts of the valve in elevation;

Figure 2 is a fragmentary cross section similar to the lower end of Figure 1 and on an enlarged scale;

Figure 3 is a detailed cross section of the main valve disc, on an enlarged scale;

Figure 4 is a vertical cross section on an enlarged scale showing the seat plug as illustrated in Figures 1 and 2;

Figure 5 is a similar view showing a modified form.

Like parts are designated by like characters throughout.

A is a portion of an engine cylinder, perforated as at $A^1$, the perforation $A^1$ being threaded at $A^2$ to receive the valve.

B is a valve cap threaded at its lower end as at $B^1$ and adapted to contain the valve parts and to be inserted into the perforation $A^1$ of the cylinder wall A. The body B is provided adjacent its lower end with an inwardly projecting flange $B^2$ adapted to receive the valve discs, which will be described later.

C is the valve body. It is hollow as shown and is provided in its lower end with an annular groove $C^1$. Adjacent its middle it is threaded, as at $C^2$, and is provided with an enlarged portion $C^3$, above the threaded portion. Communicating with the central bore of the valve cage is located an air escape passage $C^5$ which is controlled by a needle valve D, which may be moved by a knurled wheel $D^1$. Communicating with the passage $C^5$ and extending from it to any suitable point of escapement is a passage $C^6$. At its upper end the body C is screw threaded as at $C^7$. The bore of the body C is enlarged adjacent its upper end as at $C^8$ and is threaded interiorly as at $C^9$. Within this bore a packing E is placed and is held in position by the threaded gland $E^1$.

About the upper end of the valve cage is mounted a threaded collar F. This collar carries an upwardly extending portion $F^1$ which at its upper end joins a laterally extended collar $F^2$. This collar may be rotated about the valve body so as to raise and lower the valve stem with relation thereto and to cause adjustment within the valve.

Located within the valve body and supported on the flange $B^2$ is a composite or laminated valve disc G. In the form shown the several discs making up the laminated disc are not fastened together but are merely held in the relation shown. This disc is provided with the central perforation $G^1$ which is preferably enlarged downwardly. Forming the top of the composite valve disc G is a valve disc H. This disc member is provided with a central perforation which has about it a vertically extending annular flange and has provided on its upper face, an annular projection $H^2$, the upper edge of which is sharpened. P is a packing ring, preferably of soft metal such as copper, and it is forced into the groove $C^1$ by the annular projection $H^2$.

Mounted within the perforation in the discs is a seat plug I. This plug is provided with a lateral retaining flange $I^1$ which prevents its being forced through the perforation in the valve disc. It has extending downwardly from its upper face, in the form shown in Figures 1, 2 and 4, a perforation J. This perforation communicates with a perforation $J^1$ of reduced size, and the perforation $J^1$ is provided with the downwardly flaring mouth $J^2$.

Figure 5 illustrates a modified seat plug K which is provided with a laterally extending flange $K^1$ and a single bore $K^2$ of substantially constant size, having a downwardly flaring mouth $K^3$.

Within the bore of the valve body is the valve stem L. This stem is narrowed preferably throughout the larger portion of its length and is provided with the guides $L^1$ which contact the walls of the bore in the valve cage C and guide the stem. While I prefer to use these guides, they may be omitted. At is lower end the stem L is threaded as at $L^2$. It is adapted to receive a needle point M which point is locked in position on the valve stem by means of the locking nut $M^1$. The needle point M is normally seated in the perforation of the seat plug I as shown in Figures 1 and 2. Throughout a portion of its upper length the stem L is enlarged as at $L^3$. Throughout this enlarged portion it is provided with the interior bore $L^4$. Communicating with this bore and opening into the interior of the valve body are ports $L^5$. At its upper end the stem is provided with the enlarged threaded portion N and the laterally extending flange $N^1$. This flange rests upon the collar $F^2$ and when the collar is raised, bears against it and is raised with it and so raises the valve stem with it. Beneath the flange N the valve stem is provided with a threaded portion as at O. About this portion are mounted a pair of locking nuts $O^1$. These nuts are locked into position so that when the collar $F^2$ is lowered it will bear against them and the valve will be forced downward. Thus the collar $F^2$ and its attendant parts form a means for adjusting the valve stem in and out.

Although I have shown an operative device, still it will be obvious that many changes in size, shape and arrangement of parts may be made without departing materially from the spirit of my invention, and I wish therefore that my showing be taken as in a sense diagrammatic.

The use and operation of my invention are as follows:

When it is desired to use the valve to spray or inject or atomize liquid, the parts are assembled as shown. Liquid is forced into the interior of the valve under pressure. The escapement provided by the needle valve D is used in order to permit the escape of air, which may have gotten in the supply line. Under operating conditions this escapement is, of course, closed. Fuel being forced into the valve under sufficient pressure, the valve discs are bent outward and so move away from the needle point and thus permit discharge and atomization of the fuel from the valve. When the pressure is reduced, the discs move back and the valve is again seated and closed and discharge is stopped.

I claim:

In an injection atomizer, a valve body having a longitudinal bore therethrough, a needle valve disposed within said bore adjacent to the discharge end thereof and having a stem extending through said bore and exposed at the inlet end thereof, the exposed end of said stem being provided with an axial passageway opening into said bore, the stem beyond said opening being of less diameter than said bore, packing means sealing the joint between said stem and said body, a flexible perforated disk closing the discharge end of said bore and provided with a seat surrounding said perforation, and adjustable means cooperating with the exposed end of said stem whereby to position said valve in engagement with said seat, said exposed end of the stem being adapted to be coupled with an oil supply pipe.

Signed at Chicago, county of Cook and State of Illinois, this 7th day of March, 1924.

PHILIP LANE SCOTT.